(12) United States Patent
Ashikawa et al.

(10) Patent No.: US 9,724,994 B2
(45) Date of Patent: Aug. 8, 2017

(54) EXHAUST CONFIGURATION FOR A VEHICLE

(71) Applicant: KOMATSU LTD., Minato-ku, Tokyo (JP)

(72) Inventors: Hirokazu Ashikawa, Oyama (JP); Takayuki Tashiro, Hitachinaka (JP)

(73) Assignee: KOMATSU LTD., Tokyo (JP)

( * ) Notice: Subject to any disclaimer, the term of this patent is extended or adjusted under 35 U.S.C. 154(b) by 14 days.

(21) Appl. No.: 14/655,271

(22) PCT Filed: Dec. 1, 2014

(86) PCT No.: PCT/JP2014/081752
§ 371 (c)(1),
(2) Date: Jun. 24, 2015

(87) PCT Pub. No.: WO2015/129121
PCT Pub. Date: Sep. 3, 2015

(65) Prior Publication Data
US 2016/0257194 A1 Sep. 8, 2016

(51) Int. Cl.
*B60K 13/04* (2006.01)
*F01N 3/20* (2006.01)
(Continued)

(52) U.S. Cl.
CPC ............ *B60K 13/04* (2013.01); *B60P 1/00* (2013.01); *B60P 1/04* (2013.01); *B60P 1/28* (2013.01);
(Continued)

(58) Field of Classification Search
CPC ..................................................... B60K 13/04
See application file for complete search history.

(56) References Cited

U.S. PATENT DOCUMENTS 9,316,136 B2 * 4/2016 Kobayashi ............ B60K 13/04
2008/0022657 A1    1/2008 Pierpont et al.
(Continued)

FOREIGN PATENT DOCUMENTS

JP       2012184602 A    9/2012
JP         5438249 B1    3/2014
(Continued)

OTHER PUBLICATIONS

Canadian Office Action dated Apr. 27, 2016, issued in counterpart Canadian Application No. 2,902,188.
(Continued)

*Primary Examiner* — Erez Gurari
(74) *Attorney, Agent, or Firm* — Holtz, Holtz & Volek PC (57) ABSTRACT

A dump truck includes: a main frame that extends in a front-back direction of a vehicle body; an engine installed on the main frame; an exhaust aftertreatment device that is supported by the main frame and purifies exhaust gas from the engine; and a communication pipe having a first end connected to the engine and a second end connected to the exhaust aftertreatment device, in which the exhaust gas discharged from the engine flows to the exhaust aftertreatment device. The communication pipe includes: an upstream pipe extending from the engine to a lateral side thereof; a bellows pipe angularly connected to the upstream pipe and extending in an up-down direction; and a downstream pipe angularly connected to the bellows pipe.

8 Claims, 6 Drawing Sheets

(51) Int. Cl.
  *F01N 13/18* (2010.01)
  *F01N 3/021* (2006.01)
  *F01N 13/00* (2010.01)
  *B60P 1/04* (2006.01)
  *B60P 1/00* (2006.01)
  *B60P 1/28* (2006.01)

(52) U.S. Cl.
  CPC .......... *F01N 3/021* (2013.01); *F01N 3/2066* (2013.01); *F01N 13/009* (2014.06); *F01N 13/1822* (2013.01); *B60Y 2200/142* (2013.01); *F01N 2340/04* (2013.01); *F01N 2590/08* (2013.01); *Y02T 10/24* (2013.01)

(56) References Cited

U.S. PATENT DOCUMENTS

| | | |
|---|---|---|
| 2010/0031644 A1 | 2/2010 | Keane et al. |
| 2014/0124284 A1 | 5/2014 | Sekiya et al. |
| 2014/0182963 A1 | 7/2014 | Sekiya et al. |
| 2014/0196974 A1 | 7/2014 | Hayashi et al. |
| 2015/0211209 A1 | 7/2015 | Okuda et al. |

FOREIGN PATENT DOCUMENTS

| | | |
|---|---|---|
| JP | 2014065441 A | 4/2014 |
| WO | 2014054192 A1 | 4/2014 |
| WO | 2014064956 A1 | 5/2014 |
| WO | 2014184860 A1 | 11/2014 |

OTHER PUBLICATIONS

International Search Report (ISR) issued in International Application No. PCT/JP2014/081752.

Japanese Office Action (and English translation thereof) dated Oct. 27, 2015, issued in counterpart Japanese Application No. 2015-526807.

* cited by examiner

EXHAUST CONFIGURATION FOR A VEHICLE

TECHNICAL FIELD

The present invention relates to a dump truck, more specifically, to an improvement in a communication pipe through which exhaust gas from an engine installed in the dump truck is flowed to an exhaust aftertreatment device.

BACKGROUND ART

It has typically been known that a dedicated filter (DPF: Diesel Particulate Filter) captures particulate matter (PM) contained in exhaust gas from a combustion engine such as a diesel engine. A working vehicle (e.g., a dump truck and a wheel loader) in which a diesel engine is installed is required to comply with an exhaust gas regulation. Accordingly, an exhaust aftertreatment device provided with the DPF is installed in the working vehicle. The exhaust aftertreatment device is provided in an exhaust gas path from the engine (see Patent Literature 1).

In a working vehicle that travels on a rough ground and a wet and soft ground of a mine and the like, when the exhaust aftertreatment device is disposed on a lower side of the working vehicle, the exhaust aftertreatment device may be hit by pebbles thrown up during travelling of the working vehicle, or the working vehicle may sink in a wet ground together with the exhaust aftertreatment device to damage the exhaust aftertreatment device. For this reason, it is proposed to install the exhaust aftertreatment device at a higher position in such a working vehicle. For instance, in a wheel loader of Patent Literature 1, the entire exhaust aftertreatment device is superposed on the engine.

CITATION LIST

Patent Literature(s)

Patent Literature 1: International Publication No. WO2014/064956

SUMMARY OF THE INVENTION

Problems to be Solved by the Invention

However, when the exhaust aftertreatment device is provided on the engine, even after removing the exhaust aftertreatment device, a part of the engine is still covered with the communication pipe through which exhaust gas from the engine is flowed to the exhaust aftertreatment device. When the part of the engine covered with the communication pipe requires maintenance, it is necessary to remove the communication pipe before starting the maintenance of the engine, which deteriorates maintainability of the engine.

In light of the above circumstances, an object of the invention is to provide a dump truck having a favorable maintainability.

Means for Solving the Problems

A dump truck according to an aspect of the invention includes: a main frame; an engine installed to the main frame; an exhaust aftertreatment device that is supported by the main frame and purifies exhaust gas from the engine; and a communication pipe having a first end connected to the engine and a second end connected to the exhaust aftertreatment device, in which the exhaust gas from the engine is flowed through the communication pipe to the exhaust aftertreatment device, and the communication pipe includes: a first pipe extending from the engine to a lateral side of the engine; a second pipe angularly connected to the first pipe and extending in an up-down direction; and a third pipe angularly connected to the second pipe and extending to the exhaust aftertreatment device.

In the dump truck according to the above aspect of the invention, exhaust gas discharged from the engine flows through the communication pipe to the exhaust aftertreatment device. The communication pipe initially extends to a lateral side of the engine. After being bent and extending upward, the communication pipe is further bent and extends to the exhaust aftertreatment device. In other words, the communication pipe is provided at the lateral side of the engine, not just above the engine. Accordingly, maintenance of the engine from above is not obstructed by the communication pipe even when the communication pipe not removed. As described above, according to the above aspect of the invention, maintainability of the dump truck can be improved.

With this arrangement, it is preferable that the second pipe diagonally upwards extends to be apart laterally from the engine.

With this arrangement, it is preferable that the second pipe is connected to the first pipe at an obtuse angle and the third pipe is connected to the second pipe at an obtuse angle.

With this arrangement, it is preferable that the exhaust aftertreatment device includes: a particulate filter device provided on an upstream side; and a selective catalytic reduction device provided on a downstream side, the particulate filter device and the selective catalytic reduction device being in parallel to each other, and the communication pipe is connected to a diagonally lower portion of the particulate filter device.

With this arrangement, it is preferable that the communication pipe is provided in a channel shape or in a crank shape.

DESCRIPTION OF EMBODIMENT(S)

An exemplary embodiment of the invention will be described below with reference to the drawings.

In the following description, a front-back direction (or front and back), a right-left direction (or right and left) and an up-down direction (or top and bottom) respectively mean those of an operator facing the front and sitting on a cab seat in a cab 5 of a dump truck 1. The right-left direction conforms with a vehicle width direction of the dump truck 1 and the up-down direction conforms with a vehicle height direction of the dump truck 1.

In FIGS. 3 to 6, a main frame 2, an engine 3, an exhaust aftertreatment device 10, and a communication pipe 40, which are relevant parts of the invention, are exclusively shown and other portions are omitted.

Description of Outline of Dump Truck

Figure 1:
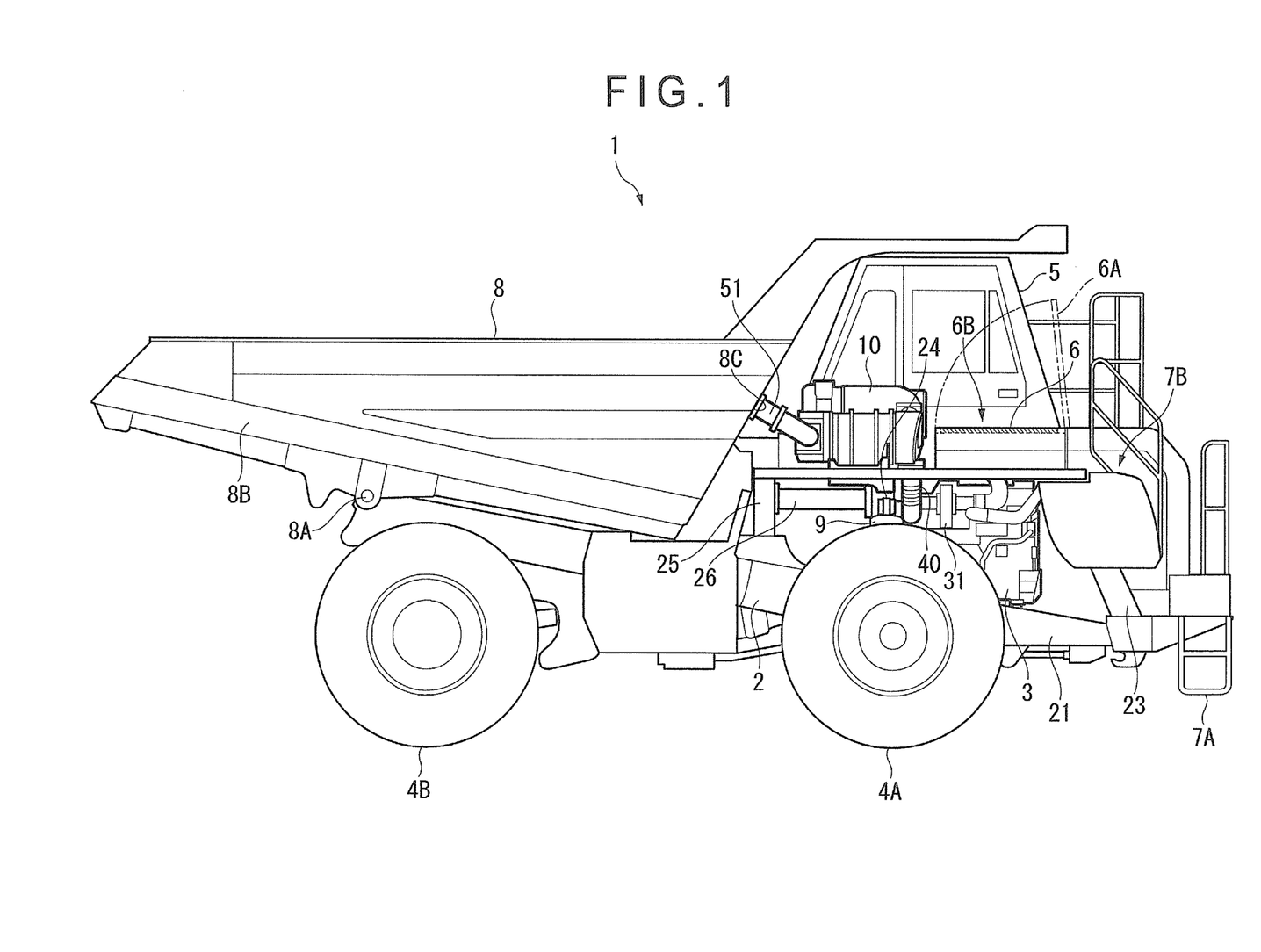
FIG. 1 is a right-side view of an entirety of a dump truck according to an exemplary embodiment of the invention.
Figure 2:
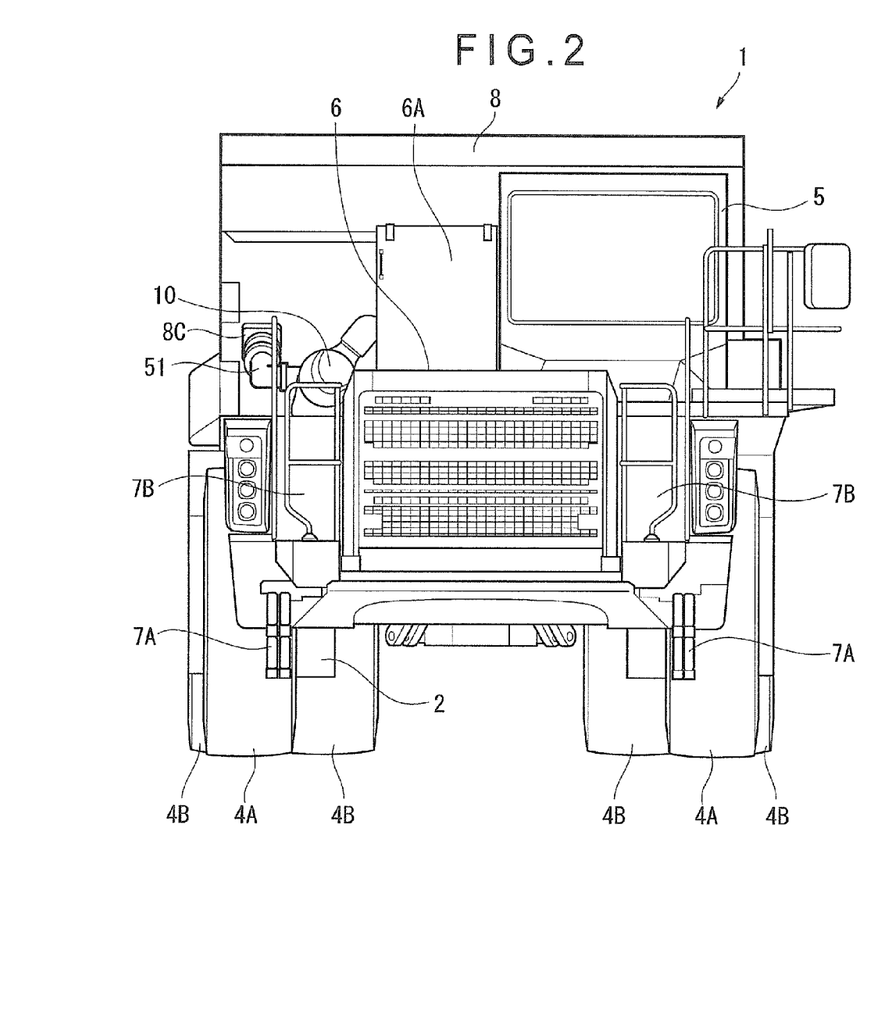
FIG. 2 is a front view of the dump truck.
Figure 3:
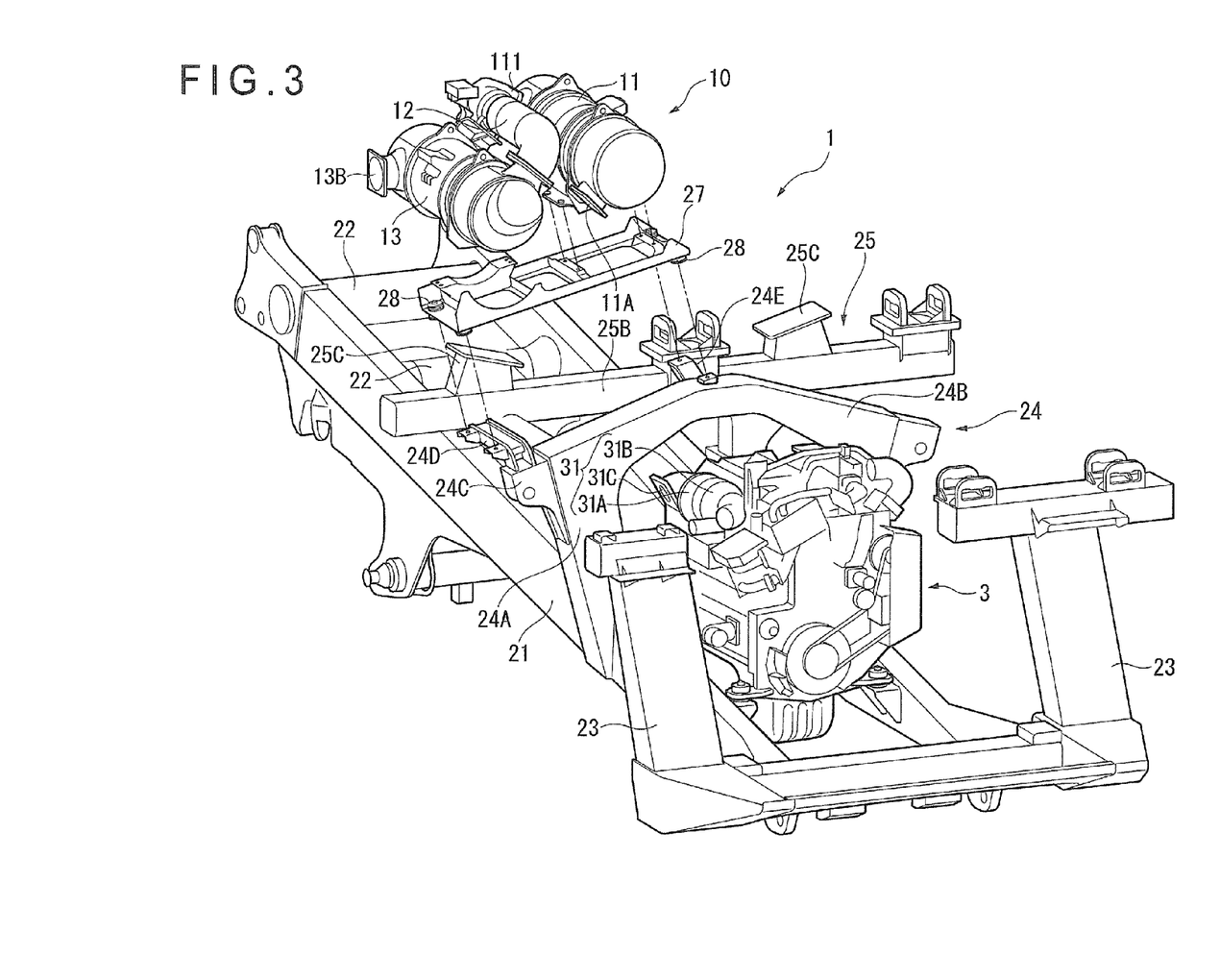
FIG. 3 is an exploded perspective view showing a relevant part of the dump truck.

As shown in FIGS. 1 to 3, the dump truck 1 includes the main frame 2 extending in the front-back direction of a vehicle body. The engine 3 is installed in the front of the main frame 2. The engine 3 of this exemplary embodiment is a diesel engine. The engine 3 includes an intake pipe into which fresh air flows, an exhaust pipe from which exhaust gas is discharged, and a supercharger 31.

The supercharger 31 is disposed between exhaust pipes. As shown in FIG. 3, the supercharger 31 includes: an exhaust turbine 31A that is rotated by the exhaust gas; and a compressor 31B that is disposed between the intake pipes and rotated together with the exhaust turbine 31A. The exhaust turbine 31A and the compressor 31B are disposed in a top-right portion of the engine 3 while being aligned in the front-back direction. An exhaust turbine outlet 31C of the exhaust turbine 31A positioned behind the compressor 31B is directed rightward and is connected to an upstream pipe inlet 41A that is an inlet of a later-described communication pipe 40. A downstream pipe outlet 43B (see FIG. 5), which is an outlet of the communication pipe 40, is connected to a DPF device inlet 11A that is an inlet of the exhaust aftertreatment device 10.

The cab 5 is provided to a front-right portion of the main frame 2. A platform 6 that is a flat operation area is provided on the right of the cab 5. As shown in FIGS. 1 and 2, the platform 6 is provided with an inspection opening 6B having an openable/closeable door 6A. The inspection opening 6B communicates with an engine room.

Moreover, a ladder 7A and a step 7B for the operator to go up and down between the cab 5/platform 6 and the ground are provided at a front end of the main frame 2.

As shown in FIGS. 1 and 2, travel wheels (front wheels 4A and rear wheels 4B) are attached to the front-right, front-left, back-right and back-left of the main frame 2. A vessel 8 in which a truckload (e.g., excavated stones and sands) is loaded is provided to a back portion of the main frame 2. By extension and retraction of a hoist cylinder (not shown), the vessel 8 can be raised or lowered around a rotary shaft 8A provided to a back end of the main frame 2.

In order to prevent the truckload from adhering to a load surface of the vessel 8 when the truckload is discharged, the dump truck 1 includes an exhaust gas flow path formed using an inner space of a rib 8B provided on an external surface of the vessel 8. The exhaust gas from the engine 3 is flowed into the exhaust gas flow path, thereby heating the vessel 8. A vessel inlet 8C into which the exhaust gas flows is provided on the right side of a front surface of the vessel 8. When the vessel 8 is not raised, the vessel inlet 8C communicates via a connecting pipe 51 with an SCR device outlet 13B that is an outlet of the exhaust aftertreatment device 10, whereby the exhaust gas flows into the rib 8B. Since moisture contained in the truckload is evaporated by heating the vessel 8 to make the truckload dry, the truckload can be prevented from adhering to the load surface.

Description of Main Frame

As shown in FIGS. 3 to 6, the main frame 2 includes: a pair of side members 21 extending in parallel to each other in the front-back direction; and a plurality of cross members 22 extending in the right-left direction to connect the pair of side members 21. Sequentially from the front, front supports 23 extending upward in a slanted manner in a lateral view, a vertical member 24 extending substantially vertically upward, and a vessel support 25 are vertically provided on the side members 21.

Figure 4:
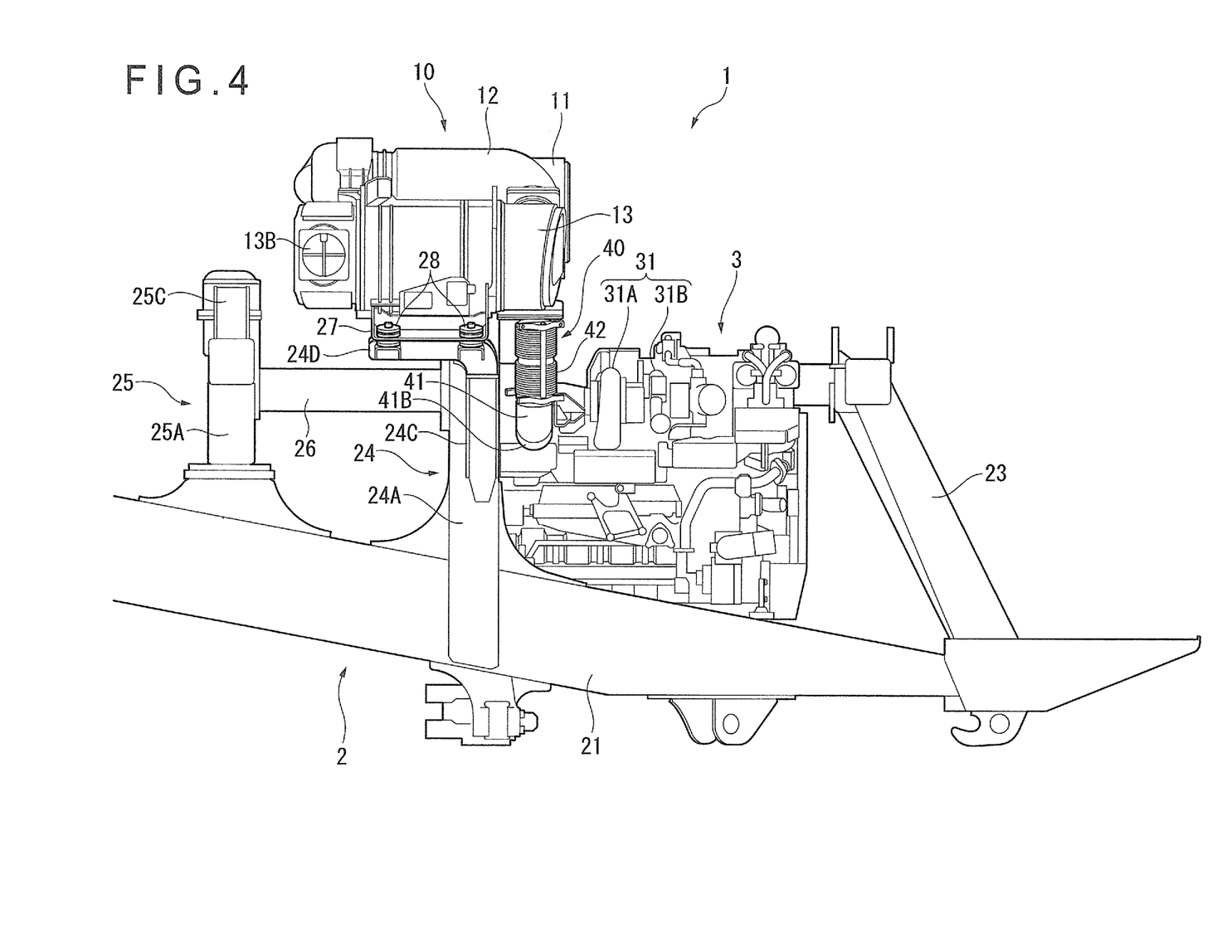
FIG. 4 is a right-side view showing the relevant part of the dump truck.

As shown in FIG. 4, the engine 3 is installed such that a front end of the engine 3 is positioned behind the front support 23 and a back end of the engine 3 is positioned within the length (i.e., length in the front-back direction) of the vertical member 24. The vertical member 24 and the vessel support 25 are connected to each other through a cylindrical side frame 26 extending in the front-back direction. With this arrangement, torsional rigidity of the main frame 2 is reinforced.

As shown in FIGS. 3 to 6, the vertical member 24 includes a pair of vertical frames 24A extending upward and a cross frame 24B bridging upper ends of the vertical frames 24A, thereby providing a portal shape. An interval between the pair of vertical frames 24A in the right-left direction is increased toward upper ends of the vertical frames 24A. The cross frame 24B is formed such that a central portion thereof projects upward and right and left portions thereof are lowered toward the respective ends in the right-left direction.

The cross frame 24B is thus formed because of the following two reasons.

The first reason is to secure a favorable right-side view from the cab 5 without being blocked by the exhaust aftertreatment device 10

The second reason is to shorten a length of an upstream pipe 41 of the communication pipe 40. In case where the cross frame 24B horizontally extends, the exhaust aftertreatment device 10 is to be horizontally installed in the cross frame 24B, whereby a bellows pipe 42 of the communication pipe 40 vertically extends. In such an arrangement, a lower end of the bellows pipe 42 becomes apart from the exhaust turbine outlet 31C, whereby the upstream pipe 41 for connecting the bellows pipe 42 and the exhaust turbine outlet 31C is lengthened. In order to prevent such a disadvantage, the cross frame 24B is angularly formed as described above.

Figure 6:
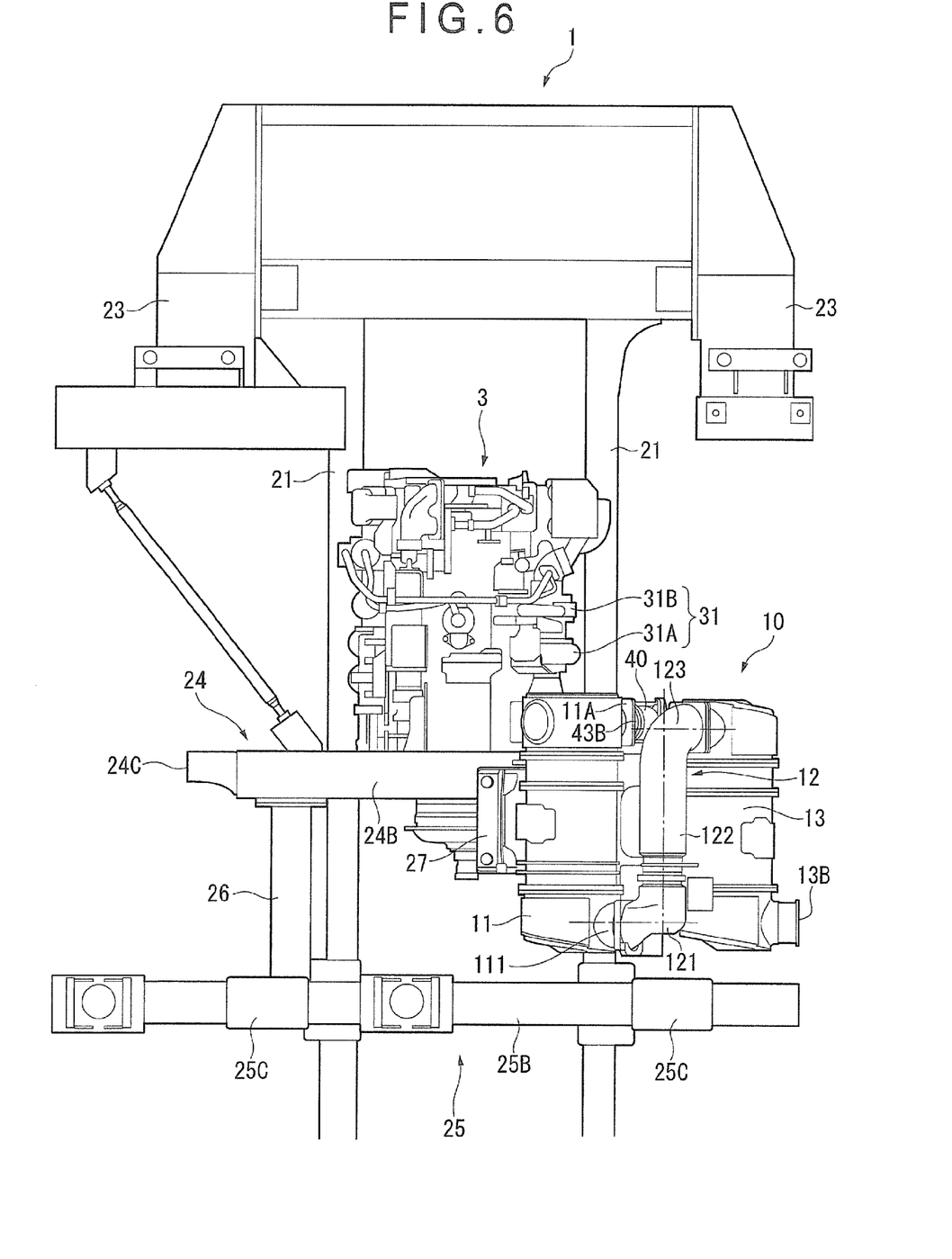
FIG. 6 is a plan view showing the relevant part of the dump truck.

As shown in FIGS. 3, 4 and 6, a connector 24C is provided to an upper end of each of the vertical frames 24A of the vertical member 24. An upper end of a front suspension 9 is rotatably connected to connector 24C (see FIG. 1).

The vessel support 25 is a portal member including a pair of vertical frames 25A and a cross frame 25B bridging upper ends of the vertical frames 25A. The vessel support 25 further includes a pair of supports 25C provided on cross frame 25B. The pair of supports 25C support a front end of the unraised vessel 8 from thereunder.

Description of Arrangement of Communication Pipe

Figure 5:
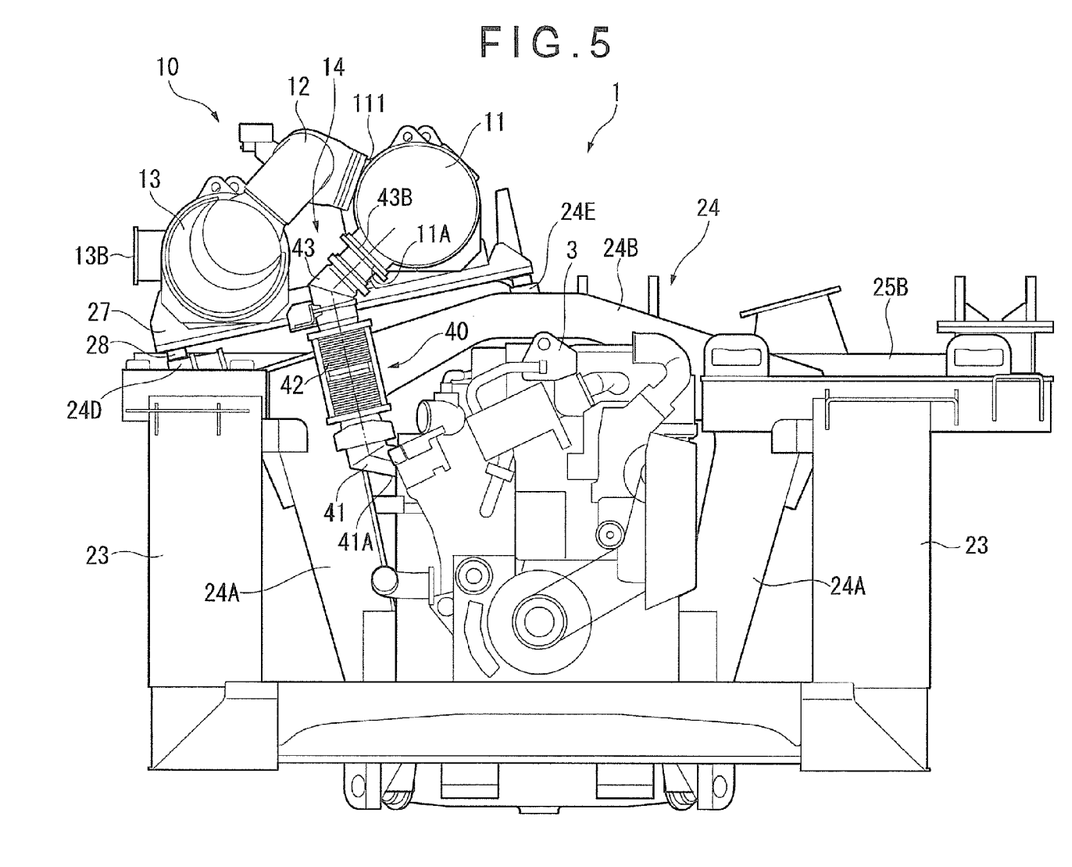
FIG. 5 is a front view showing the relevant part of the dump truck.

As shown in FIG. 5, the communication pipe 40 includes the upstream pipe 41 (a first pipe), the bellows pipe 42 (a second pipe), and a downstream pipe 43 (a third pipe). Exhaust gas sequentially flows through the upstream pipe 41, the bellows pipe 42 and the downstream pipe 43 in the communication pipe 40. The downstream pipe outlet 43B is connected to the DPF device inlet 11A that is the inlet of the exhaust aftertreatment device 10.

The upstream pipe 41 extends from the engine 3 toward the right thereof. The bellows pipe 42, which is extendible and contractable, is connected to the upstream pipe 41 at an obtuse angle and extends diagonally upwards to be apart rightwards from the engine 3. The downstream pipe 43 is connected to the bellows pipe 42 at an obtuse angle and extends left-upwards toward the exhaust aftertreatment device 10. The communication pipe 40 is disposed in a channel shape in a front view.

In the right side view shown in FIG. 4, the communication pipe 40 extends in the up-down direction along the vertical frame 24A, in which the downstream pipe outlet 43B (see FIG. 5) is positioned substantially vertically above the upstream pipe inlet 41A.

Since the communication pipe 40 is connected to the exhaust aftertreatment device 10 while passing on the right of the engine 3, maintenance of the engine 3 through the platform 6 is not obstructed due to the communication pipe 40.

Since the communication pipe 40 is provided with the bellows pipe 42, the communication pipe 40 can absorb radial and axial displacements between the engine 3 and the exhaust aftertreatment device 10 caused by vibration and the like during traveling of the dump truck.

A spherical flange or a slidable cylindrical pipe may be alternatively used in place of the bellows pipe 42 or in addition to the bellows pipe 42 in the communication pipe 40.

Description of Arrangement of Exhaust Aftertreatment Device

The exhaust aftertreatment device 10, into which exhaust gas flows from the communication pipe 40, includes a Diesel Particulate Filter (hereinafter abbreviated as DPF) device 11, a mixing device 12, and a Selective Catalytic Reduction (hereinafter abbreviated as SCR) device 13 in a sequence from an upstream side of an exhaust gas flow direction. In the exemplary embodiment, each of the DPF device 11 and the SCR device 13 is formed in a cylinder extending in the front-back direction as shown in FIG. 6. In the front view shown in FIG. 5, the DPF device 11 are disposed on an inner side of the dump truck in the right-left direction. The SCR device 13 is disposed outside of the DPF device 11 with a space 14 (see FIG. 5) interposed therebetween.

The DPF device inlet 11A that is the inlet of the exhaust aftertreatment device 10 is provided in a front of the DPF device 11 and faces downward to the right. As shown in FIG. 5, the communication pipe 40 extends toward the space 14 between the DPF device 11 and the SCR device 13 to be connected to a diagonally lower portion of the DPF device 11. In other words, the communication pipe 40 is connected to the DPF device 11 within the space 14. Moreover, as shown in FIG. 5, in the front view, the communication pipe 40 is located within the width of the exhaust aftertreatment device 10.

The arrangement of the exhaust aftertreatment device 10 will be described.

The DPF device 11 includes a cylindrical case and a columnar DPF (not shown) housed in the case. The DPF captures particulate matter in the exhaust gas passing through the DPF.

As shown in FIG. 6, the mixing device 12 includes: an upstream elbow pipe 121 that is connected to an outlet pipe 111 of the DPF device 11 and changes the flow direction of the exhaust gas discharged from the DPF device 11 by approximately 90 degrees; a straight pipe 122 that is connected to a downstream end of the upstream elbow pipe 121 and extends in a direction intersecting with an axis of the outlet pipe 111 of the DPF device 11; and a downstream elbow pipe 123 that is connected to a downstream end of the straight pipe 122 and further changes the flow direction of the exhaust gas by approximately 90 degrees.

The upstream elbow pipe 121 is attached with an injector (not shown) that injects a urea aqueous solution as a reductant aqueous solution into the straight pipe 122. The urea aqueous solution injected from the injector into the exhaust gas is thermally decomposed into ammonia by heat of the exhaust gas. Together with the exhaust gas, ammonia is supplied to the SCR device 13 as a reduction-causing agent. The SCR device 13 is connected to a downstream end of the downstream elbow pipe 123.

The SCR device 13 includes a cylindrical case and a columnar SCR (not shown) housed in the case. The SCR reduces and purifies nitrogen oxides in the exhaust gas by using ammonia formed as a reduction-causing agent in the mixing device 12. A catalyst for decreasing ammonia may be provided on the downstream side of the SCR in the case. The catalyst for decreasing ammonia oxidizes ammonia unused in the SCR to be harmless.

The DPF device 11, the mixing device 12 and the SCR device 13 as described above are juxtaposed such that the respective flow directions of the exhaust gas passing therethrough are substantially in parallel. Accordingly, the flow directions of the exhaust gas flowing in the DPF device 11 and the SCR device 13 are opposite to the flow direction of the exhaust gas flowing in the mixing device 12. The exhaust aftertreatment device 10 having this arrangement is substantially S-shaped in the plan view as shown in FIG. 6. As described above, the SCR device outlet 13B that is the outlet of the exhaust aftertreatment device 10 is connected to the vessel inlet 8C through the connecting pipe 51.

As described above, the inlet 8C of the vessel 8 is provided on a right side of a front surface of the vessel 8. The exhaust aftertreatment device 10 is provided to the right of the vertical member 24. Moreover, the exhaust aftertreatment device 10 is provided to the cross frame 24B of the vertical member 24 such that a center of the exhaust aftertreatment device 10 in the front-back direction is shifted backward relative to the cross frame 24B. Accordingly, a distance between the inlet 8C of the vessel 8 and the outlet 13B of the SCR device 13 is shortened.

Description of Installation Arrangement of Exhaust Aftertreatment Device

As shown in FIG. 3, a bracket 24D extends backward from a top surface of the connector 24C of the vertical member 24. A bracket 24E extends backward from a central back surface of the vertical member 24. The exhaust aftertreatment device 10 is fixed on the brackets 24D and 24E through a sub frame 27 and an anti-vibration rubber 28. The exhaust aftertreatment device 10 is supported on the cross frame 24B of the vertical member 24 in such a cantilever state that the center of the exhaust aftertreatment device 10 in the front-back direction is shifted backward relative to the cross frame 24B while the exhaust aftertreatment device 10 is tilted downward to the right (see FIG. 4).

Since the exhaust aftertreatment device 10 is supported while being tilted downward to the right, a left view from the cab 5 is favorably secured without being blocked by the exhaust aftertreatment device 10.

Since the exhaust aftertreatment device 10 is supported in such a cantilever state that the center of the exhaust aftertreatment device 10 in the front-back direction is shifted backward, a dead space on the back side of the platform 6 is effectively used and maintenance of the engine 3 through the platform 6 is kept from being obstructed by the exhaust aftertreatment device 10.

Since the bracket 24D and the sub frame 27 are provided, the aftertreatment device 10 is reliably supported even though being shifted backward.

In the invention, the position of the anti-vibration rubber 28 is not required to be the same as in the exemplary embodiment. Further, the anti-vibration rubber 28 is not necessarily provided. When the anti-vibration rubber 28 is not provided, other mechanism(s) may be provided to absorb vibration and shock.

Description of Maintenance of Engine

A maintenance method of the engine 3 in the dump truck 1 in the exemplary embodiment will be described with reference to FIGS. 1 and 2. The right-side view of FIG. 1 shows a closed door 6A for the inspection opening 6B while showing an opened door 6A by a chain double-dashed line. The front view of FIG. 2 shows the opened door 6A for the inspection opening 6B.

In the dump truck 1 in the exemplary embodiment, for the maintenance of the engine 3, the operator opens the inspection opening 6B provided on the platform 6 on the right of the cab 5 and performs the maintenance on the engine 3. For instance, since the supercharger 31 is provided in the top-right portion of the engine 3, the maintenance of the supercharger 31 is carried out through the inspection opening 6B. In addition, attachment/detachment of a head cover and adjustment of the fuel injector can be carried out through the inspection opening 6B.

Advantage(s) of Embodiment(s)

In the dump truck 1 of the exemplary embodiment, exhaust gas discharged from the engine 3 flows through the communication pipe 40 to the exhaust aftertreatment device 10. The communication pipe 40 initially extends to the right of the engine. After being bent and extending upward, the communication pipe 40 is further bent and extends to the exhaust aftertreatment device 10. In other words, the communication pipe 40 is provided on the right of the engine 3, not just above the engine 3. Accordingly, maintenance of the engine 3 from above is not obstructed by the communication pipe 40 even when the communication pipe 40 is not removed. Consequently, in the exemplary embodiment, maintenance of the dump truck 1 can be facilitated.

Description of Modification(s)

The invention is not limited to the above-described embodiment, but includes modifications and improvements as long as an object of the invention can be achieved.

For instance, although the DPF device 11 is disposed on the inner side of the dump truck and the SCR device 13 is disposed outside of the DPF device 11 in the exemplary embodiment, the DPF device 11 and the SCR device 13 may be transposed or aligned in the front-back direction.

Although the exhaust aftertreatment device 10 includes the DPF device 11 and the SCR device 13 in the exemplary embodiment, the exhaust aftertreatment device 10 may only include the DPF device 11.

Although the communication pipe 40 is provided in a channel shape in the exemplary embodiment, when the DPF device 11 is disposed outside of the SCR device 13 as described in the above modification, the communication pipe 40 may be provided in a crank shape. Alternatively, when the DPF device 11 and the SCR device 13 are aligned in the front-back direction, the downstream pipe 43 may be twisted by 90 degrees and connected.

The invention is applicable not only to a rigid dump truck but also to an articulated dump truck.

The invention claimed is:

1. A dump truck comprising:
    a main frame;
    an engine installed to the main frame;
    an exhaust aftertreatment device that is supported by the main frame and that purifies exhaust gas from the engine; and
    a communication pipe having a first end connected to the engine and a second end connected to the exhaust aftertreatment device, wherein:
    the exhaust gas from the engine flows through the communication pipe to the exhaust aftertreatment device,
    the exhaust aftertreatment device is disposed above the engine to define a space between the exhaust aftertreatment device and the engine, and
    the communication pipe comprises:
        a first pipe extending from a lateral side of the engine in a direction away from the engine;
        a second pipe angularly connected to the first pipe and extending in an up-down direction; and
        a third pipe angularly connected to the second pipe and extending to the exhaust aftertreatment device, so that the communication pipe circumvents an engine space which covers an area corresponding to an upper surface of the engine in plan view, wherein the engine space includes the space between the exhaust aftertreatment device and the engine.

2. The dump truck according to claim 1, wherein the second pipe extends diagonally upwards to be laterally apart from the engine.

3. The dump truck according to claim 1, wherein:
    the second pipe is connected to the first pipe at an obtuse angle, and
    the third pipe is connected to the second pipe at an obtuse angle.

4. The dump truck according to claim 1, wherein:
    the exhaust aftertreatment device comprises:
        a particulate filter device provided on an upstream side; and
        a selective catalytic reduction device provided on a downstream side, the particulate filter device and the selective catalytic reduction device being in parallel to each other, and
    the communication pipe is connected to a diagonally lower portion of the particulate filter device.

5. The dump truck according to claim 1, wherein the first pipe and the third pipe are bent in a same direction to be connected to ends of the second pipe.

6. The dump truck according to claim 1, wherein the first pipe and the third pipe are bent in different directions to be connected to ends of the second pipe.

7. The dump truck according to claim 1, wherein:
    the exhaust aftertreatment device is disposed toward a back side of the engine in a vehicle front-back direction of the dump truck, and
    the first pipe extends from one side of the engine in a vehicle width direction of the dump truck.

8. The dump truck according to claim 1, further comprising a platform that is provided above the engine, the platform including an inspection opening having an openable/closeable door to access the engine, wherein the inspection opening is provided in the engine space which covers the area corresponding to the upper surface of the engine in plan view.

* * * * *